Oct. 19, 1971 P. H. STIBBE 3,613,462
DRIVE BELT ASSEMBLY FOR TRACTOR MOUNTED IMPLEMENT
Filed June 10, 1970 2 Sheets-Sheet 1

INVENTOR.
PAUL H. STIBBE.

BY:
CULLEN, SETTLE, SLOMAN & CANTOR.
ATT'YS.

INVENTOR.
PAUL H. STIBBE.

BY:
CULLEN, SETTLE, SLOMAN & CANTOR.
ATT'YS.

United States Patent Office 3,613,462
Patented Oct. 19, 1971

3,613,462
DRIVE BELT ASSEMBLY FOR TRACTOR
MOUNTED IMPLEMENT
Paul H. Stibbe, Neenah, Wis., assignor to J. I. Case
Company, Racine, Wis.
Filed June 10, 1970, Ser. No. 44,916
Int. Cl. F16h 37/02, 7/10
U.S. Cl. 74—15.4                11 Claims

ABSTRACT OF THE DISCLOSURE

A PTO belt drive assembly includes an engine driven pulley which drives a twin pulley assembly comprising the power take-off for an implement and which is supported for rotation on a pivotally mounted countershaft; the pivotally mounted countershaft is loaded in the direction of the belt drive for rotation around its pivot to tension the belt-engagement around the pulleys and is provided with a release and clutch linkage arrangement to pivot the countershaft carrying the twin PTO drive pulleys in the opposite direction of the belt drive to thereby disengage the twin PTO pulleys from the engine drive.

BACKGROUND OF THE INVENTION

The present invention relates to drive mechanisms for tractor mounted implements and particularly to a novel PTO drive mechanism having belt tensioning and de-clutching means synonymous with each other.

It has been a conventional practice to drive implements such as for an instance, a rotary lawn mower mounted underneath a tractor body, from a forward drive pulley rotatable about a fore and aft extending axis by means of an endless belt, the belt being disposed over a pair of pulleys rotatable about a transversely extending axis and threaded about the driven pulley or pulleys on the implement which rotate about vertically extending axis. Drive pulleys which are of the type known as mule pulleys are rotatably journaled on a pair of arms which are welded to a rock shaft. Also welded to the rock shaft is an adjusting arm including adjusting means usually in the form of a threaded bolt secured to the adjusting arm, the other end of the bolt having a nut with a potrion of the tractor frame or body. Thereby, by adjusting the nut the belt is proposed to be tensioned after initial assembly of the parts. After operation, when the belt is elongated, it is again necessary to tension the belt and this adjustment is likewise performed through respective adjustment of the nut on the bolt secured to the adjusting arm.

This construciton of belt tensioning adjustment and mule pulley supports has been found to be unsatisfactory because, when the belt is initially tensioned, it becomes difficult thereafter to apply the correct amount of tensioning to the belt. Thus, if the nut is tightened too much, too much tension will be applied to the belt, causing it to stretch and wear out rapidly. On the other hand, if too little tension is applied to the belt, it may not properly drive the implement and additionally may be caused to jump from the pulleys. In either case, the belt drive will not operate properly if not properly tensioned to the required amount.

A further problem existing in the known PTO belt drives for implements is the difficulty of installation of the drive belt for the implement around the PTO drive pulley or removal therefrom for servicing or replacement of the implement or for similar reasons. In order to do this, the adjusting bolt must be completely loosened to cause the rock shaft of the idler pulleys to pivot into the release position. This procedure appears to be awkward and requires an amount of manual laber which is highly undesirable, especially in the drive arrangement for implements mounted on a garden-type of tractor operated by laymen not skilled in mechanics.

Furthermore, the provision of the clutching or de-clutching arrangement in the known type of belt drives is extremely difficult and complicated and subject to early failure or malfunction, if not serviced and operated properly.

Thus, the primary cause of failure in the known PTO belt drive systems for implements resides in the manually adjustable tensioning arrangement acting on the idler pulleys of the belt drive system, since proper belt tensioning adjustment, when performed by a layman, is nearly impossible to obtain leading to either (1) slipage in the drive system or (2) complete malfunction because of rupture of the drive belt.

SUMMARY OF THE INVENTION

The present invention provides an improved PTO belt drive system for tractor mounted implements mounted underneath the tractor body.

The power take-off arrangement is connected to the engine drive by means of a drive belt and includes twin mounted drive pulleys mounted for simultaneous rotation on a cylindrical housing which is pivoted to the tractor body. The upper pulley of the PTO drive mechanism receives driving power from the engine driven pulley which is transferred to the lower drive pulley through a shaft disopsed in the PTO housing. The lower drive pulley drives the implement drive pulleys through a system of fixed and spring loaded idler pulleys. The spring loaded idler pulley at the implement drive belt assembly exerts a constant tensioning force on the implement drive belt which is counteracted or supplemented by respective pivoted movement of the twin mounted PTO drive pulleys.

The upper PTO drive pulley of the twin mounted PTO drive mechanism, as mentioned before, is drivingly connected to the engine driven pulley for rotation thereby. In order to disconnect the PTO drive from the engine driven pulley, a clutch and de-clutch mechanism has been provided by means of an arm attached to the cylindrical and pivotally mounted PTO housing which is connected to a rod or other linkage having a pivotally mounted control lever at its other end. Thus, by manipulation of the control lever, the rod or linkage will be moved longitudinally to rotate the PTO housing around its pivotal connection to either a clutch or de-clutch position relative to the PTO belt drive from the engine drive. If the PTO housing which mounts the twin PTO drive pulleys is pivoted in the direction opposite to the direction of the belt drive, tensioning on the belt drive is decreased to such a point as to enable the belt to be slipped on the PTO drive pulleys. Conversely, if the PTO housing is rotated in the same direction as the direction of the belt drive, the PTO drive pulleys will be forced into driving engagement with the belt. Thus, by this provision, the PTO belt drive can be selectively clutched or de-clutched from the engine drive.

The clutch arrangement includes an adjustable belt tensioning mechanism in the form of a coil spring disposed around the clutch rod and acting in a direction of the belt drive against an arm attached to the PTO housing to thereby constantly urge the PTO housing rotatably in the direction in which the belt is being driven to thereby apply proper belt tensioning to the belt drive system. The expansion force of the coil spring can be manually adjusted by lengthening or shortening the effective length of the spring in order to obtain sufficient tension for the belt to transmit torque from the engine driven pulley to the PTO drive pulleys.

As mentioned earlier, the manually adjustable tensioning force acting on the PTO drive pulleys is augmented or counteracted by the tensioning force of the spring loaded idler pulley at the implement belt drive to thereby obtain a system of balancing tensioning forces providing at all times proper belt tensioning at both the PTO belt drive mechanism and the implement belt drive mechanism.

The novel advantages and features of the present improved PTO belt drive system will become apparent or be particularly pointed out in the following detailed description in connection with the appended drawings.

BRIEF DESCRIPTION OF THE DRAWINGS

The appended drawings illustrate, partly schematically, a preferred form of embodiment of the present invention and in which.

DESCRIPTION OF THE PREFERRED EMBODIMENT

Figure 1:
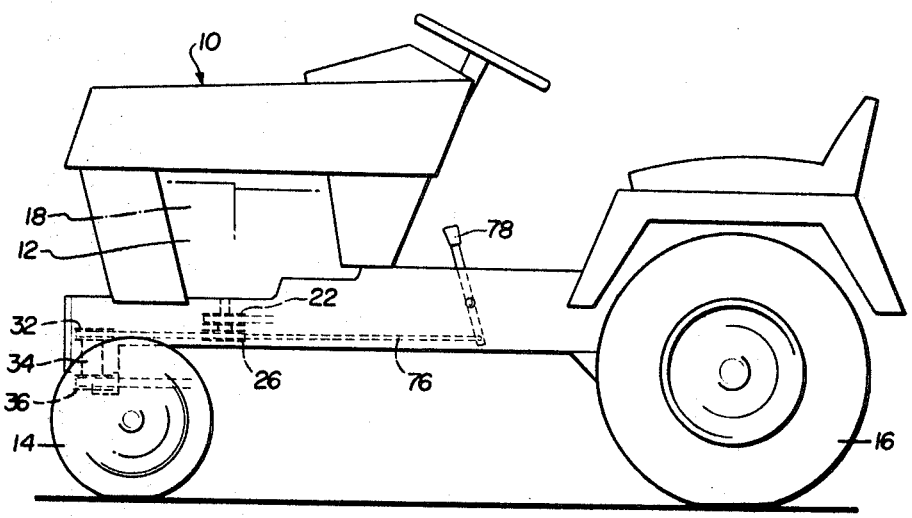
FIG. 1 is a side illustration of a garden-type tractor incorporating the present invention.
Figure 4:
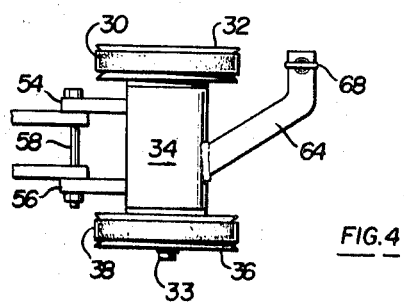
FIG. 4 is an end view of the PTO belt drive system shown in FIG. 2.

With reference to FIG. 1, a motor vehicle is illustrated here of the garden-type tractor 10 having an engine compartment 12 and ground engaging front wheels 14 and rear wheels 16. As is usual, the rear wheels 16 are power driven from an engine 18 contained in the engine compartment 12 by means of a belt or chain drive mechanism (not shown).

Figure 2:
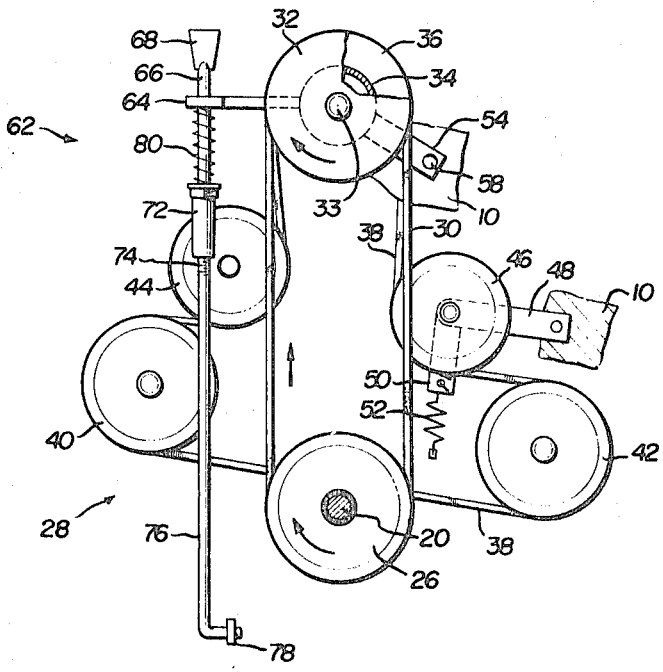
FIG. 2 is a schematic top plan view of the present novel PTO drive belt system and tensioning and clutch mechanism therefor.
Figure 3:
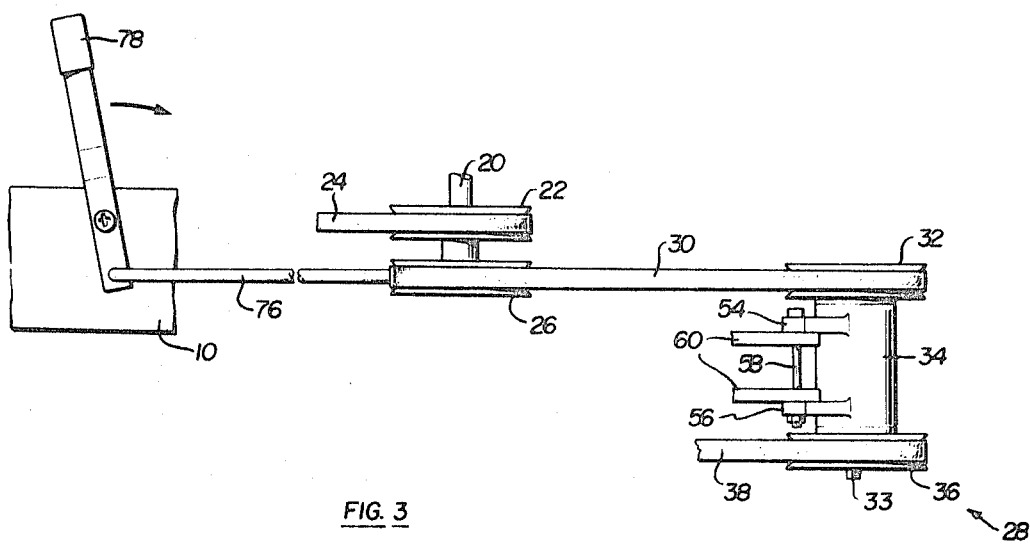
FIG. 3 is a partial left-hand side view of the PTO belt drive system shown in FIG. 2.

The engine 18 is vertically positioned and has an output shaft 20 (FIGS. 2 and 3) on which is mounted an upper drive pulley 22 adapted to drive the rear wheels 16 by means of a belt 24. The engine drive shaft 20 also mounts a lower pulley 26 which is secured to the upper pulley 22 by any known means such as splines, keys or the like (not shown) to be rotatable in unison therewith.

The lower, engine driven pulley 26 is the output pulley for the PTO belt drive mechanism generally indicated at 28, adapted to drive an implement such as a rotary lawn-mower or the like (not shown) which may be mounted underneath the tractor body between the front wheels 14 and rear wheels 16.

The belt drive mechanism 28 includes a drive belt 30 drivingly connected to the pulley 26 which is driven by the engine and rearwardly thereof to a pulley 32 which is the PTO power input pulley. The power input pulley 32 is rotatably supported on a shaft 33 extending through a cylindrical housing 34 on the other end of which is supported an output pulley 36 attached to the same shaft which supports the upper or input pulley 32. The output pulley 36 is drivingly connected by means of an implement or attachment drive belt 38 to the different pulleys of the implement.

The implement, for example a rotary dual blade lawn-mower (not shown) has its blades, in operation, driven by respective spindle pulleys 40 and 42 by means of the implement drive belt 38. The implement drive belt 38 adjacent the spindle drive pulley 40 extends around a fixed idler pulley 44 which is supported for rotation on a stationary part of the mower housing. On the other side of the drive arrangement adjacent the spindle pulley 42, the implement drive belt 38 extends around an adjustable idler pulley 46 which is supported for rotation on the end of an arm 48 which is pivoted to a stationary part of the mower housing 18. A bracket 50 is attached to the end of the pivot arm 48 to which is secured one end of a coil tension spring 52, the other end of which is secured to the housing of the mower 18. Thus, the adjustable idler pulley 46 is constantly urged by the compression force of the spring 52 against the implement drive belt 38 to thereby tension the belt sufficiently for transmission of driving torque from the lower output pulley 36 to the blade pulleys 40 and 42.

The cylindrical PTO housing 34 is pivotally supported on the vehicle by means of spaced brackets 54 and 56 extending therefrom and which are connected by a pivot pin 58 to a stationary part 60 of the vehicle. Thus, if the support housing 34 is swung in the direction of the rotation of the engine driven pulley 26, the tension on the PTO drive belt 30 as well as on the implement drive belt 38 will be increased since both input pulley 32 and output pulley 36 are supported on the housing 34. Conversely, if the housing 34 is swung in the direction towards the engine drive pulley 26, the tension on both drive belts 30 and 38 will be decreased.

In order to maintain both drive belts 30 and 38 in a sufficient torque transmitting tension, a combination tension adjustment and clutch mechanism 62 has been provided which will now be described in detail.

Figure 5:
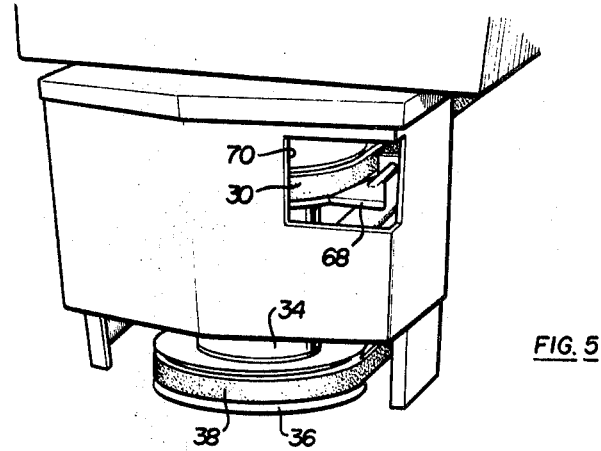
FIG. 5 is a perspective front view of the tractor front end showing the lower PTO drive pulley and the access means provided in the belt drive housing of the tractor to perform manual belt tensioning adjustment.

The PTO housing 34 is provided with an arm 64 extending from the housing in a direction opposite from the pivot brackets 54 and 56. The end of the arm 64 is apertured to receive the end of a rod 66 extending therethrough and which is provided at one side of the brackets with a control knob 68 which, as seen in FIG. 5 is accessible from the outside of the vehicle by the provision of an opening 70 in front of the vehicle body for a reason to be explained hereafter. The rod 66 extends into and is corotatable with an adapter sleeve 72 which is rotatable around a threaded portion 74 at the end of a control link 76 which other end is provided with a control lever 78 pivoted to a stationary part of the vehicle body.

An expansion coil spring 80 is disposed around the rod 66 between the arm 64 and the adapter sleeve 72 such as to exert a constant spring force against the arm 64 thereby tending to rotate the PTO housing 34 around the pivot pin 58 in the direction away from the engine driven pulley 26 to thereby tension both drive belts 30 and 38. This tension arrangement at the PTO housing 34, which simultaneously tensions the PTO drive belt 30 from the engine drive belt 26 and the implement drive belt 38, is in addition to and supplemented by the spring loaded pivoted idler pulley 46 and the forces of the springs 52 and 80 are designed in such relation to each other as to supplement each other without over-tensioning the drive belts 30 and 38.

By means of rotation of the adjusting knob 68 from the outside (FIG. 5), the adapter sleeve 72 can be moved up or down on the link 76 to thereby decrease or increase the effective length of the spring 80. Thus, by threadedly moving the adapter 72 toward the arm 64 (thus shorten spring 80), spring pressure is increased against the arm 64 tending to rotate the housing 34 in a direction away from the engine drive pulley 26 to thereby increase tension on the belt or belts 30 and 38. Conversely, by lengthening the effective length of the spring 80, the spring pressure on the arm 64 is decreased to thereby likewise decrease the tension on the drive belts 30 and 38. It will be noted that the direction of rotation of the drive belts 30 and 38 is in the direction of the force exerted by the spring 80 instead of against the spring 80 to thereby maintain an effective control of the tension adjustment. By proper spring tension adjustment of the PTO housing 34 by the adjusting knob 68 to compensate for the spring pressure applied against the implement drive belt 38 by the spring loaded idler pulley 46, a system of balance tension forces is obtained for proper tensioning of both the PTO drive belt 30 and the implement drive belt 38.

A control link 76 and control lever 78 have been provided to selectively clutch or de-clutch the PTO drive mechanism 28 from the engine drive. To de-clutch the PTO drive mechanism 28, the lever 78 is manipulated by the operator of the vehicle in the direction of arrow 79 (FIG. 3) to longitudinally move the link 76 and rod 66 connected thereto by the adapter sleeve 72 in a direction (downwardly in FIG. 2) so as to force the control knob 68 into contact against the ram 64 to thereby pivot the PTO housing 34 in a counter-clockwise direction towards the engine drive pulley 26. Thus, the tension on the drive belts 30 and 38 is released, so as to interrupt the transmission of torque from the engine drive pulley 26. It will be understood that the control lever 78 can be selectively locked in a de-clutched position by and such known means as detents, ratchets or the like (not shown).

In the de-clutched position of the PTO drive mechanism 28, driving torque to the implement 18 is interrupted in order to move the implement to another location or for attaching or detaching the implement 18. It will be noted that the driving attachment of the implement 18 or detachment is relatively simple since only one implement drive belt needs to be removed or attached from or to the PTO output pulley 36.

To re-established drive connection between the engine drive pulley 26 and the PTO drive 28, the control lever 78 is manipulated by the operator in the opposite direction to release the spring 80 which then again exerts a rotational force on the arm 64 to rotate the PTO housing 34 in a direction away from the engine drive pulley 26 tensioning the drive belt 30 to thereby re-establish driving connection between the engine drive pulley 26 and the PTO input drive pulley 32.

It will be evident from the foregoing description, that the present improved belt drive power take-off mechanism provides an effective, balanced belt adjustment arrangement which, at the same time, permits easy installation of the implement and attachment of the driving mechanism of the implement to the engine drive of the vehicle.

The relatively few parts used in the PTO drive belt tensioning and de-clutch mechanism are inexpensive to manufacture and easy to service.

The novel combination, belt tension and de-clutch mechanism, functions to de-clutch the PTO drive from the engine drive without affecting the prior set belt tension so that upon re-establishing of the drive connection, readjustment of the belt tension will not be necessary.

The direction of belt tensioning force is always in the direction of driving movement of the belts so as to always maintain a positively controlled tension on the drive belts.

When the unit is de-clutched tension is relieved on all belts to thereby reduce static stresses and expand the life expectancy of the belts.

Although the present invention has been described with reference to one preferred embodiment only, it will be understood that various modifications in detail can be made without departing from the spirit and essential characteristic of the invention, and such modifications are contemplated to be included within the scope of the appended claims.

What is claimed is:

1. In a combination with a vehicle having a chassis and an implement associated with said chassis adapted to be driven by the prime mover of said vehicle; a power take-off mechanism mounted on said chassis for selectively establishing drive connection between said prime mover and said implement, said power take-off mechan comprising: a support member pivotally mounted on said chassis, first and second rotatable members mounted for unitary rotation on said support member, said prime mover having an output shaft carrying a driving member at its end, said implement having at least one driven member, first means to selectively drivingly connect said driving member of said prime mover with said first rotatable member, second means drivingly connecting said driven member of said implement with said second rotatable member, adjustable resilient means normally constantly urging said support member in one direction to simultaneously maintain equal transmission of driving torque between said first rotatable member and said driving member of said prime mover, and between said second rotatable ble member and said driven member of said implement, and means to selectively interrupt torque transmission between said driving member and said driven member.

2. In the combination as defined in claim 1, said means to ensure torque transmission between said driving member and said driven member comprising: a linkage and an arm attached to said support member, one end of said linkage being connected to said arm, the other end of said linkage being connected to the end of a control lever being pivotally connected in said vehicle for manipulation thereof by the operator of said vehicle so that movement of said control lever in one direction will cause longitudinal movement of said linkage to rotate said support member in a direction towards the driving member of said prime mover to thereby simultaneously interrupt said first and second drive connection means between the driving member and said first rotatable member and between said second rotatable member and said driven member.

3. In the combination as defined in claim 2, said adjustable resilient means comprising: an expansion spring disposed around the upper end of said linkage means, one end of said spring being retained on said linkage, and the other end of said spring being retained against said arm to thereby tend to rotatably urge said support member in another direction opposite from the direction causing interruption of torque transmission.

4. In the combination as defined in claim 3, said linkage means comprising: a first link threadedly engaged with said means retaining one end of said spring on said linkage, said means defining a sleeve rotatable on said first link for movement therealong and, means connected to said sleeve for rotation of said sleeve to thereby vary the effective length of said spring to adjust the spring force acting on said arm.

5. In the combination as defined in claim 4, said means attached to said sleeve comprising: a rod extending longitudinally through said spring and through an aperture provided in said arm, a control knob attached to the other end of said rod for rotation of said rod to thereby rotate said sleeve for movement of said sleeve longitudinally along said link for adjustable compression or expansion of said spring.

6. In the combination as defined in claim 1, said support member comprising: a cylindrical housing rotatably carrying a shaft extending longitudinally through said housing, said first rotatable member being connected to said shaft adjacent one end of said housing and said second rotatable member being connected to the other end of said shaft adjacent the other end of said housing for unitary rotation relative to said housing upon rotation of said driving member.

7. In the combination as defined in claim 6, said housing being pivotally mounted on said chassis at a point removed from said housing for pivotal movement of said housing in both directions about said point.

8. In the combination as defined in claim 1, said driving member, said first and said second rotatable members and said driven members comprising pulleys, said first drive connection means comprising an endless belt threaded around said driving member and said first rotatable member and said second driven connection means comprising a second endless belt threaded around said driven member and said second rotatable member.

9. In the combination as defined in claim 8, said adjustable resilient means being adapted to adjustably vary the tension of said first and said second endless belt.

10. In the combination as defined in claim 9, said second drive connection means including a resiliently supported idler pulley in rotatable contact with said endless belt to automatically, varibly adjust the tension of said second endless belt.

11. A belt tension adjusting mechanism for a power-take-off belt drive transmission comprising: a driving pulley and a driven pulley drivingly connected by means of a first endless belt, said driven pulley being connected to a driven pulley for unitary rotation therewith, said drive pulley being drivingly connected to a driven member adapted to be rotated by said driving member by means of a second endless belt, said belt tension adjusting mechanism comprising: a housing disposed between said driven pulley and said drive pulley, said housing being supported for pivotal movement around an axis remote from said housing, a shaft supported for rotation within said housing and connected to both said driven pulley and said drive pulley, and means normally resiliently urging said housing around said pivot axis in a direction towards said pivot axis to thereby adjustably increase the tension of said first and second second endless belt.

References Cited

UNITED STATES PATENTS

| | | | |
|---|---|---|---|
| 3,065,811 | 11/1962 | Parrett | 74—242.15 (R) X |
| 3,226,853 | 1/1966 | Kamlukin | 74—242.15 (R) X |
| 3,311,186 | 3/1967 | Kamlukin | 74—242.15 (R) X |

LEONARD H. GERIN, Primary Examiner

U.S. Cl. X.R.

74—15.63, 242.15 (R)